UNITED STATES PATENT OFFICE.

FRIEDRICH LUDWIG SCHMIDT, OF CHARLOTTENBURG, GERMANY, ASSIGNOR TO THE ROESSLER & HASSLACHER CHEMICAL COMPANY, A CORPORATION OF NEW YORK.

PROCESS OF MAKING BORATES CONTAINING ACTIVE OXYGEN.

1,006,798.     Specification of Letters Patent.     Patented Oct. 24, 1911.

No Drawing.     Application filed October 4, 1909. Serial No. 520,825.

*To all whom it may concern:*

Be it known that I, FRIEDRICH LUDWIG SCHMIDT, a subject of the German Empire, residing at Charlottenburg, Germany, have invented a certain new and useful Process of Making Borates Containing Active Oxygen, of which the following is a specification.

Borates containing active oxygen (perborate, perborax etc.) have recently attained to technical importance. As raw materials for the preparation of these products, recourse is had to the peroxids which have been for some time available on the market in the chemical industry, viz, barium peroxid, hydrogen peroxid and sodium peroxid. The principal borate containing active oxygen is the sodium perborate, $$NaBO_3 4aq.$$

This is principally employed as a bleaching agent which does not tender the fibers. In this respect it possesses considerable advantages over the chlorid of lime generally used, but on the other hand its high price prevents its general application. A further disadvantage of the perrate which contains the highest percentage (10.38%) of active oxygen of all sodium perborates, is that its oxygen is very easily liberated when the product is not quite free from catalytically acting impurities, *e. g.* compounds of iron or manganese, so that the product in a more or less short time loses considerably in commercial value.

I have now found that it is not necessary for bleaching purposes to manufacture this high concentrated product, but that it is more advantageous to prepare products with less active oxygen and a higher percentage of borax, they having the property of retaining the active oxygen more firmly. For this purpose I employ sodium peroxid. I have found that when borax and sodium peroxid are mixed in varying proportions and this mixture is heated, liquefaction takes place under 70°, the active oxygen of the sodium peroxid being given up to the borax. In this way it is possible to produce borates containing active oxygen. The borates containing active oxygen prepared in this way assume a thickly fluid paste on cooling. Solid products can be obtained by adding boric acid to the melt in order to neutralize the alkali hydroxid which is formed.

In place of the boric acid used for the last named purpose, other acids or acid salts may be utilized. To them belong also, naturally, those acids the salts of which have an action of their own, viz: the higher fatty acids which with alkali form soaps. The melting is accomplished either by the aid of some water, or by the aid of salts containing water of crystallization. Among these salts are included the salts of organic acids, *e. g.* soaps, from which soaps containing active oxygen are obtained. The addition of such salts during the melting insures the process working more smoothly. The principal advantage of such products, obtained by melting with sodium peroxid, is their great cheapness. Surprising is the fact that, when the melting process is skilfully carried out, there is no appreciable loss of active oxygen. This is the more remarkable, as the sodium perborate and the remaining salts of the perboric acid rapidly divest themselves of oxygen when heated with water at a temperature of from 50 to 60 degrees.

Besides cheapness the new products obtained by melting have the advantage of great stability.

The new products may be produced by mixing all the starting materials and by bringing this mixture to the melting point. It is then advantageous to execute the melting process in a vessel having a flat bottom of considerable area so that the layer thereon remains thin and no overheating takes place by the heat of reaction.

When the layer of material to be worked is thicker, it is best to regulate the temperature of the reaction by bringing part of the mixture into reaction by melting and introducing in portions fresh quantities of the mixture. Finally the temperature may be regulated by bringing one substance or a mixture of several substances to the melting point and gradually introducing the other substances.

The latter methods of operation are on the whole not different from the first; they lead to the same final products and are only to be preferred for the reason that the temperature of the reaction can more easily be regulated by the gradual introduction.

*Examples.*

1. A mixture of 40 kg. borax, 25 kg.

boric acid and 8 kg. sodium peroxid (90%) are heated until the mass is uniformly liquefied. The temperature during the operation is about 60° C. 30 kg. of water are added to the melt and the mass is allowed to cool. After a time the mass solidifies.

2. 0.5 kg. of sodium peroxid and 1.8 kg. of boric acid are mixed. This mixture is gradually added, it being stirred all the time, to a mixture consisting of 1 kg. of crystalline sodium phosphate, 0.4 kg. of anhydrous sodium phosphate and 0.6 kg. of borax. The mixture is effected in such a manner that the reaction produces a temperature of about 50–60 degrees. It is then allowed to cool. Then the mixture rapidly solidifies. The product contains 2 per cent. of active oxygen.

3. 20 kg. of boric acid, 7 kg. borax, 7 kg. of silicate of sodium, 22 kg. of soap and 10 kg. of water are mixed. 5 kg. of sodium peroxid are gradually added in such a manner that the reaction produces a temperature of about 50–60°. It is then allowed to cool. The product contains about 1.4 per cent. of active oxygen.

4. 10 kg. of boric acid, 5 kg. of hydrated silicic acid, 22 kg. of stearic acid and 15 kg. of water are mixed. 6 kg. of sodium peroxid are gradually added in such a manner that the reaction produces a temperature of about 50–60°. Then the mass is allowed to cool. It contains about 1.7 per cent. of active oxygen.

What I claim is:

1. The process of making borates containing active oxygen by heating borax and boric acid with sodium peroxid to a temperature of about 60° C. thereby melting the same, then allowing the mass to cool and solidify.

2. The process of making borates containing active oxygen by heating sodium peroxid with boric acid, boric acid salts and only so much water, that the mass is moistened, to a temperature of about 60° C. thereby melting the same, then allowing the mass to cool and solidify.

3. The process of making borates containing active oxygen which consists in heating sodium peroxid with borax and acid substances to a temperature of about 60° C. thereby melting the same, then allowing the mass to cool and solidify.

4. The process of making borates containing active oxygen which consists in heating sodium peroxid with boric acid and boric acid salts to a temperature of about 60° C. thereby melting the same, then allowing the mass to cool and solidify.

In witness whereof I have hereunto signed my name this 16th day of August, 1909, in the presence of two subscribing witnesses.

FRIEDRICH LUDWIG SCHMIDT.

Witnesses:
WOLDEMAR HAUPT,
HENRY HASPER.